(12) United States Patent
Peschany

(10) Patent No.: US 7,459,207 B2
(45) Date of Patent: Dec. 2, 2008

(54) PLATED-SHAPED CARBON FIBRE COMPOSITE MATERIAL

(75) Inventor: Sergey Peschany, Karlsruhe (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 0 days.

(21) Appl. No.: 11/913,026

(22) PCT Filed: Mar. 14, 2006

(86) PCT No.: PCT/EP2006/002289

§ 371 (c)(1),
(2), (4) Date: Oct. 29, 2007

(87) PCT Pub. No.: WO2006/114161

PCT Pub. Date: Nov. 2, 2006

(65) Prior Publication Data

US 2008/0102246 A1 May 1, 2008

(30) Foreign Application Priority Data

Apr. 28, 2005 (DE) ......................... 10 2005 019 730

(51) Int. Cl.
*B32B 17/12* (2006.01)
(52) U.S. Cl. .................. 428/293.4; 428/113; 428/408; 428/212; 376/150; 442/203
(58) Field of Classification Search ............. 428/113, 428/212, 293.4, 292.1, 408, 299.1, 300.7, 428/119, 105, 111; 442/203, 205, 206, 207, 442/218; 376/150
See application file for complete search history.

(56) References Cited

U.S. PATENT DOCUMENTS

| 3,927,157 | A | * | 12/1975 | Vasterling ................. 423/447.4 |
| 5,390,217 | A | * | 2/1995 | Ioki et al. .................... 376/150 |
| 5,491,000 | A | | 2/1996 | Hocquellet et al. |
| 5,586,152 | A | * | 12/1996 | Ioki et al. .................... 376/150 |
| 6,691,393 | B2 | * | 2/2004 | James et al. ................. 29/419.1 |
| 2002/0170787 | A1 | * | 11/2002 | James et al. ............. 188/218 XL |
| 2003/0138615 | A1 | * | 7/2003 | Gruber et al. ............. 428/292.1 |

(Continued)

FOREIGN PATENT DOCUMENTS

EP 0 339 606 11/1989

(Continued)

OTHER PUBLICATIONS

G. Federici et al., "Key ITER plasma edge and plasma-material interaction issues", Journal of Nuclear Materials vols. 313-316, Mar. 2003, pp. 11-22.

(Continued)

*Primary Examiner*—N Edwards
(74) *Attorney, Agent, or Firm*—Darby & Darby

(57) ABSTRACT

The characteristic analysis of erosion of NB31 carbon-fiber composite enables the proposal of a novel carbon-fiber composite structure having a distinctly reduced erosion rate. Improvement only relates to the arrangement of the sewing and web fibers and to maintaining the structure of the pitch/carbon fibers, which consist of the main NB31 heat conducting components. The sewing and web fibers of the improved structure reinforce the rigidness/reinforce the thermal shield, compared to the NB31. The improved structure improves the erosion rate so it is 4-5 times lower compared to that of NB31.

19 Claims, 6 Drawing Sheets

U.S. PATENT DOCUMENTS

2004/0074075 A1* 4/2004 James et al. .............. 29/419.1
2008/0102246 A1* 5/2008 Peschany .................... 428/113

FOREIGN PATENT DOCUMENTS

| JP | 02 074894 | 3/1990 |
| JP | 07 187833 | 7/1995 |
| WO | 02/08150 | 1/2002 |

OTHER PUBLICATIONS

S. Pestchanyi et al., "3-D simulation of macroscopic erosion of CFC under ITER off-normal heat loads", Fusion Engineering and Design, vol. 66-68, 2003, pp. 271-276.

S. Pestchanyi et al. Brittle destruction of carbon based materials under off-normal ITER-FEAT conditions, Physica Scripta. vol. T91, 2001, pp. 84-89.

S. Pestchanyi et al. Effective Thermal Conductivity of Graphite Materials with Cracks, Physica Scripta. vol. T111, 2004, pp. 218-220.

Pestchanyi S et al, "Estimation of carbon fibre composites as ITER divertor armour", Journal of nuclear materials, vol. 329-333, Aug. 1, 2004, pp. 697-701, XP004524794, Amsterdam, NL.

Bolt H et al, "Materials for the plasma-facing components of fusion reactors", Journal of nuclear materials, vol. 329-333, Aug. 1, 2004, pp. 66-73, XP004524672, Amsterdam, NL.

* cited by examiner a)

b)

c)

d)

a)

b)

c)

d)

US 7,459,207 B2

PLATED-SHAPED CARBON FIBRE COMPOSITE MATERIAL

CROSS REFERENCE TO RELATED APPLICATIONS

This is a U.S. National Phase application under 35 U.S.C. §371 of International Application No. PCT/EP2006/002289, filed on Mar. 14, 2006, and claims the benefit of German Patent Application No. 102005019730.2, filed on Apr. 28, 2005, both of which are incorporated herein. The International Application was published in German on Nov. 2, 2006 as WO 2006/114161 A1 under PCT Article 221(2)

FIELD OF THE INVENTION

The present invention relates to plate-shaped carbon fiber composites (CFC).

BACKGROUND

Plate-shaped carbon fiber composites are used to protect equipment which would be damaged or destroyed by heat when directly exposed to a particle flux. In order to prevent this, such sensitive equipment is lined with CFC tiles, at least in the surface area that is exposed to the particle flux. Examples of such equipment include bodies entering the atmosphere, such as rocket aircraft, space gliders, or aircraft which travel at very high speeds in thin atmospheres and return to denser atmospheres. Also under consideration are vane devices which rotate at high speed in an atmosphere, in particular the outer regions of such vanes. In general, any body that is exposed to an impacting particle flux causing a high heat flux load, and which must to be protected from heat may be included here.

A further field of application of plate-shaped carbon fiber composites is that of tokamak- or stellarator-type fusion machines. Such fusion machines have diverters installed therein, which are exposed to a particle flux from the magnetically toroidally confined thermonuclear plasma. Direct exposure of such diverters to an impacting particle flux would create high thermal stress therein, which would not allow for economical operation. Because of this, the diverters, such as those used in JET and ASDEX Upgrade, are covered and mechanically reinforced with about 2 cm thick armor tiles, sized about $10 \times 10$ cm$^2$, in the surface area that is exposed to said particle flux. The wall/armor is heated by the incident heat flux from this plasma. However, in these facilities, the controllable stationary heat flux of 10-20 MW/m$^2$ is superimposed by short bursts of approximately 10 GW/m$^2$, that is, a value 1000 times greater, said bursts substantially increasing the already high thermal stress, though only for very short periods of time.

NB31 and NS31 grade carbon fiber composites (CFC) were developed for the diverter armor of tokamak ITER. These carbon fiber composites have a high thermal conductivity and a low erosion rate, and are appropriate for a stationary tokamak operation at characteristic temperatures of 1000-1500 K, as described in G. Federici et al. *Key ITER plasma edge and plasma-material interaction issues. Journal of Nuclear Materials Volumes* 313-316, March 2003, 11-22. However, NB31 has high erosion rates due to brittle destruction in the temperature range of 3000-3500 K, which was shown by experiments using electron beam facilities and by numerical analyses of the erosion of carbon fiber composites under extreme heat flux and off-normal ITER events, such as edge localized modes (ELM) and vertical deflection events (VDE)as described in S. Pestchanyi, V. Safronov I. Landman, *Estimation of carbon fibre composites as ITER divertor armour, Journal of Nuclear Materials*, Vol. 329-333 (2003) 697-701 and S. Pestchanyi, H. Wuerz, *Brittle destruction of carbon based materials under off-normal ITER-FEAT conditions, Phys. Scr.* T91 (2001) 84-89.

Numerical simulations for NB31 using the Pegasus-3D code have revealed that the high erosion rate of NB31 is due to an erosion mechanism caused by local overheating as described in S. Pestchanyi et al, *3-D simulation of macroscopic erosion of CFC under ITER off-normal heat loads, Fusion Engineering and Design.* V. 66-68 (2003) 271-276. The local overheating erosion mechanism (LOEM) results from the complex structure of CFC, which consists of a carbon matrix and a carbon fiber reinforcement. The main component of the reinforcement, the carbon or pitch fiber, has a high thermal conductivity and, in an armor of the type under discussion, is always perpendicular to the surface that is exposed to the heat flux. Such a fiber composite is woven and stitched using polyacrylnitrile fibers running parallel to the heated surface.

The large difference in the fiber and matrix coefficients of thermal expansion is decisive for the local overheating erosion mechanism. Increased erosion in the local overheating erosion mechanism is due to the preferential cracking at the interfaces between the fibers and the matrix, followed by thermal isolation of the polyacrylnitrile fibers by, or because of, the matrix. Experiments and numerical simulation both yield the same erosion pattern for the NB31 CFC. Erosion begins in the region of the polyacrylnitrile fibers, which are parallel to the surface. The erosion rate of the polyacrylnitrile fibers is always much higher than that of the highly thermally conductive pitch/carbon fibers, which are perpendicular to the surface. The "valleys" along the polyacrylnitrile fibers laterally undermine the pitch fiber regions by inducing additional erosion (see FIGS. 3 and 5), thus strongly and increasingly reducing the functional duration until catastrophe occurs, just as in a positive feedback process.

A feature of the local overheating erosion mechanism, namely the preferential erosion of the sites of woven and stitched fibers parallel to the heated surface, has been demonstrated.

The local overheating erosion mechanism of the NB31 shield/NB31 armor reveals a particularly high erosion rate for this grade of CFC. Experiments confirm an increased erosion of NB31 under repetitive loads, characteristic for type I edge localized modes in ITER.

SUMMARY

It is an object of the present invention to provide an improved CFC structure which resists not only a stationary nominal heat flux, but also repeated, short-duration heat fluxes which exceed many times the stationary heat flux in a pulse-like manner and result in strong local overheating, and which improved CFC structure is therefore not, or at least only to a tolerable degree, affected by erosion.

In an embodiment, the present invention provides a plate-shaped carbon fiber composite with an impact surface that is exposed to a particle flux. The plate-shaped carbon fiber composite includes a base fabric in a carbon matrix. The base fabric has pitch fibers that are substantially perpendicular to the impact surface and second fibers disposed at an angle with respect to the impact surface that is between 0° and 90°.

BRIEF DESCRIPTION OF THE DRAWINGS

The present invention will be described in more detail below with reference to exemplary embodiments and drawing FIGS. 1 through 6, in which:

FIG. 1a is a view of the NB31 structure showing the thermally conductive pitch fibers and the woven and stitched polyacrylnitrile fibers, without the carbon matrix;

FIG. 1b is a view showing the sample of FIG. 1a, with the carbon matrix and with the front side cut away to highlight the fiber structure;

FIG. 1c is a view of the present invention, in which the position of pitch fibers is unchanged and the woven and stitched fibers are inclined at an angle of 45°;

FIG. 1d is a view showing the stitched and pitch fibers of FIG. 1c;

FIG. 2 shows a numerical simulation of two CFC samples which are heated from the upper edge in the figure;

FIG. 3a shows the beginning erosion of a first layer;

FIG. 3b shows the opening of the first layer;

FIG. 3c shows the opening of the second layer;

FIG. 3d shows the erosion of the third layer;

FIG. 4a shows the surface of incidence still almost intact;

FIG. 4b shows the surface of incidence as it begins to erode;

FIG. 4c shows little erosion progress;

FIG. 4d is a view showing the fabric structure, which still exists in its entirety;

DETAILED DESCRIPTION

The invention provides plate-shaped carbon fiber composite with a novel arrangement of the woven and stitched threads. Based on results obtained in simulations, it was found that, in order to significantly improve the erosion resistance of the CFC, the number of fibers extending in the CFC structure in a direction parallel to the reinforcement surface must be as small as possible, which applies in particular to the woven and stitched fibers. The polyacrylnitrile fibers, which provide the increase in mechanical strength, cannot be eliminated from the CFC structure. Perpendicular fibers provide the mechanical strength in the plane of the surface that acts as reinforcement. The present invention includes woven and stitched fibers inclined at a suitable angle with respect to the surface in order to substantially reduce the erosion rate. More specifically, the woven and stitched fibers do not run parallel to the surface impacted and heated by the particle flux, but at an angle in the range of $$0° < \alpha < 90°,$$

or in a specific embodiment, in the range of $$30° < \alpha < 60°.$$

In an embodiment where the angle of inclination is between 30-60°, this allows optimization for a specific environment or application, according to the required ratios of erosion resistance to mechanical stiffness.

In the present invention the direction of the pitch fibers may provide the thermal conductivity similar to NB31. If the stitched and woven fibers of the improved structure are inclined at 45° with respect to the heated surface, they may be perpendicular to each other so that the material reaches a reinforcement stiffness comparable to that of NB31. Numerical simulation of the erosion of the present invention has confirmed that the erosion rate is 4 to 5 times lower compared to that of NB31.

Analysis of the erosion mechanism led to the proposition of the present invention. The invention includes stitched and woven fibers at an angle to the heated surface. The perpendicular arrangement of the pitch fibers with respect to the impacted surface that causes the heat flux remains the same as in the known NB31-type CFC. The stitched and woven fibers of the improved structure are perpendicular to each other, so that they reach an armor stiffness comparable to that of NB31.

The present invention may be used in the armor of diverters used in the fusion facilities mentioned above. The analysis and dimensioning of heat shields/armors which are strongly exposed to oncoming streams of gas particles which would cause corresponding heat fluxes from the impacted surface to the interior can be treated in the same way, or at least nearly so. Therefore, the present invention may also be sued in such applications.

Figure 1:
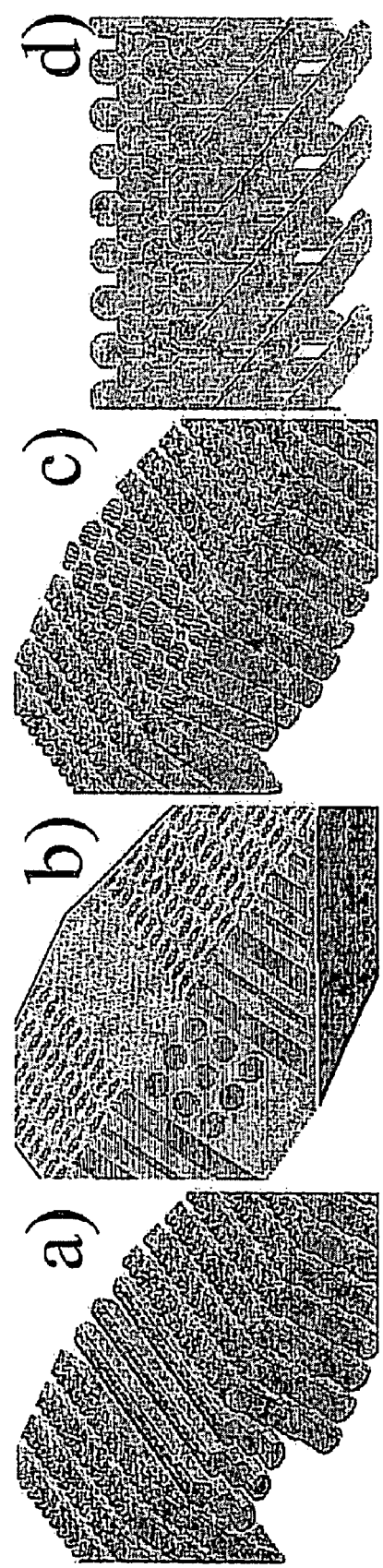
FIG. 1 shows the fiber structure of prior CFC NB31 and the present invention, specifically.

The specific erosion mechanism, local overheating erosion mechanism described in S. Pestchanyi, V. Safronov I. Landman, *Estimation of carbon fibre composites as ITER divertor armour*, Journal of Nuclear Materials, Vol. 329-333 (2003) 697-701, and S. Pestchanyi et al, *3-D simulation of macroscopic erosion of CFC under ITER off-normal heat loads*, Fusion Engineering and Design. V. 66-68 (2003) 271-276 concerns the CFC NB31. Local overheating erosion mechanism causes a strong, non-linear increase in the erosion rate at high temperatures in the range from 3000 to 4000 K due to local overheating of the CFC matrix and the fibers, the base fabric, in the vicinity of the stitched polyacrylnitrile fibers parallel to the heated surface. Overheating occurs due to the specific arrangement of the carbon fiber structure, especially in NB31. The NB31 structure is optimal in terms of thermal conductivity, which is provided by the pitch or carbon fibers which are still perpendicular to the heated surface of the armor. The pitch fibers having a high thermal conductivity of up to 1000 W/mK along the fiber axis constitute a proportion of approximately 30% of the volume fraction of NB31. In addition to the high thermal conductivity, the NB31 plates should also be of sufficient stiffness. The overall stiffness, which is provided by the base fabric, namely 4% of the volume fraction by weaving and 4% by stitching of pitch fibers through polyacrylnitrile fibers, reinforces the NB31 armor in two directions, namely perpendicular to the pitch fibers. This structure is shown in FIG. 1a and FIG. 6. The woven and stitched fibers run parallel to the surface that is impacted by the particle flux. FIG. 1b is a cross-sectional view of FIG. 1a, showing the carbon matrix at the front to highlight the fibers. The fibers themselves are bundles of filaments which are loose, stranded or braided. The filaments have a diameter in the range from 20-100 μm. In order to manufacture the fiber composite, the base fabric, the three fibers, namely pitch, woven and stitched fibers, are formed into bundles of from several to a large number of such microthin filaments, respectively, depending on the strength, weaving and stitching requirements.

FIGS. 1c and 1d illustrate the fiber structure of the present invention: the same pitch fibers are perpendicular to the impacted surface, while the woven and stitched fibers are inclined at 45° thereto. FIG. 1d is an enlarged view of the arrangement of the stitched and pitch fibers. The surface which is impacted by particles and causes the heat flux is shown at the top.

The local overheating erosion mechanism in NB31 acts in accordance with a significant difference between the thermal expansion coefficients of the carbon fibers and the carbon matrix filling the spaces between the fibers. These large differences are typical of both the pitch and polyacrylnitrile fibers. The difference of the thermal expansion coefficients results in thermal stress during heating of the NB31 armor. The thermal stress is concentrated at the interfaces between the fibers and the matrix. During edge localized modes, the temperature rises to 3000 to 4000 K, and the thermal stress concentration preferentially causes cracking of the fiber/matrix interface for all fibers, independently of their orientation. The resulting reduction in thermal conductivity has different consequences for the thermally conductive pitch fibers and the woven and stitched fibers. The pitch fibers are perpendicular to the heated armor surface, and the heat spreads along the fibers. Cracks in the side walls of the fibers do not prevent propagation/spreading of the heat flux. Therefore, the heat transfer in the armor regions filled with pitch fibers is independent of the cracks at the interfaces/points of contact with the CFC matrix. This is completely different for the woven and stitched fibers parallel to the surface. In such regions, the heat spreads through the fibers, so that the cracks at the interfaces/points of contact of these fibers drastically reduce the effective thermal conductivity in the direction of the heat flux. A reduction in the effective thermal conductivity causes an increase in the surface temperature of the CFC matrix above the stitched fibers having cracked/burst side walls/shells.

Figure 2A:
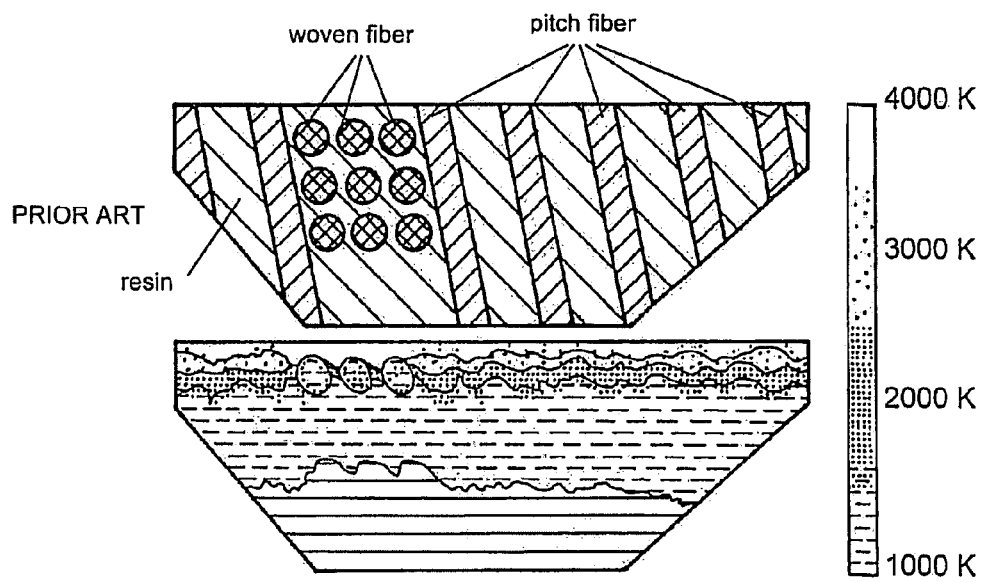
FIG. 2a shows a prior NB31 structure.
Figure 2B:
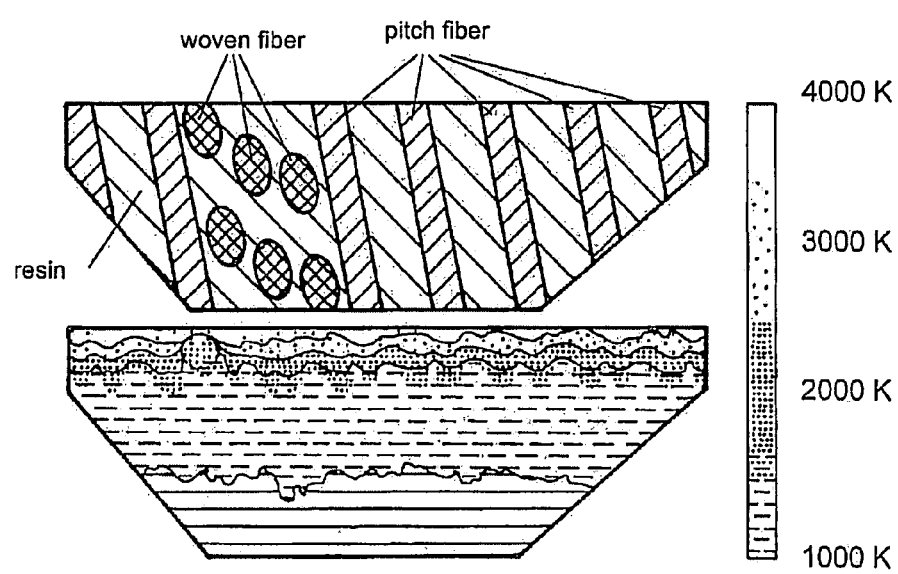
FIG. 2b shows the structure of the present invention.

FIG. 2 shows the numerical simulation of two CFC samples which are heated from the top surface: FIG. 2a shows that of NB31 and FIG. 2b shows that of the present invention.

The samples are shown in a cross-section through the stitched fibers and along the pitch fibers running in a vertical direction. The upper sub-figures of FIGS. 2a and 2b show the CFC structure including the fibers. The lower sub-figures show the structure of the upper sub-figures at a surface temperature of 3500-4000 K. The temperature in the lower structures is illustrated by the degree of blackening. The temperature scale is plotted vertically and centrally in the figure, the color white representing 4000 K and the color black representing 1000 K. The matrix under the stitched fibers is overheated in NB31 (FIG. 2a) compared to the present invention shown in FIG. 2a. Shown are the cross sections of the illustrated sample heated from the upper surface with a constant heat flux of 5 GW/m². The specified heat flux is characteristic for type I edge localized modes in ITER. The respective upper portion illustrates the fiber structure of NB31 including the thermally conductive pitch fibers, which run vertically downward from the heated upper surface, and the stitched fibers, which are arranged parallel to the surface and shown as circles. The spaces between the fibers are filled with carbon matrix material. At such temperatures, the shells/surfaces of the first three fibers near the surface are already cracked or burst, so that the effective thermal conductivity is reduced by the cracks, and the temperature of matrix above the fibers is higher than the surface temperature of the pitch fibers and the surrounding matrix.

The cracking of graphite materials is determined by the thermal stress created during heating from outside. Cracking of the graphite armor is due to two physical reasons. The first one is the anisotropy of neighboring graphite grains or fibers, so that cracking is proportional to the graphite temperature itself. The second contribution occurs in accordance with the temperature gradient within the armor/heat shield. Estimations (described in S. E. Pestchanyi_ and I. S. Landman, *Effective Thermal Conductivity of Graphite Materials with Cracks, Physica Scripta.* Vol. T111, 218-220, 2004) revealed that for heating conditions which are characteristic for edge localized modes, plasma disruptions and other off-normal events in ITER, the anisotropic contributions to cracking are always much higher than the contributions resulting from temperature gradients. This result suggests that the overheated regions of NB31 CFC neighboring the woven and stitched fibers crack in accordance with the temperature differences and erode to a greater degree than the CFC regions of pitch fibers.

Figure 3:
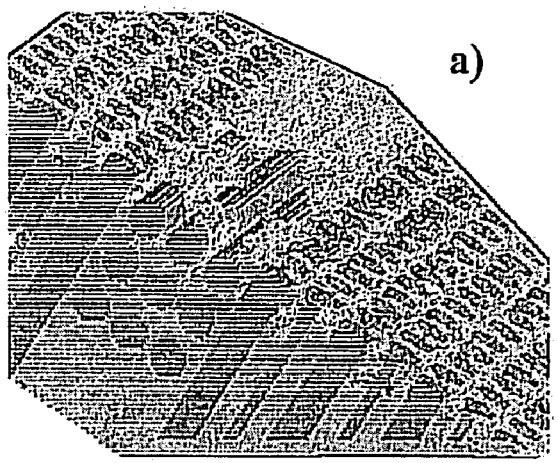
FIG. 3 shows the progression of erosion of a prior NB31 surface.
Figure 3:
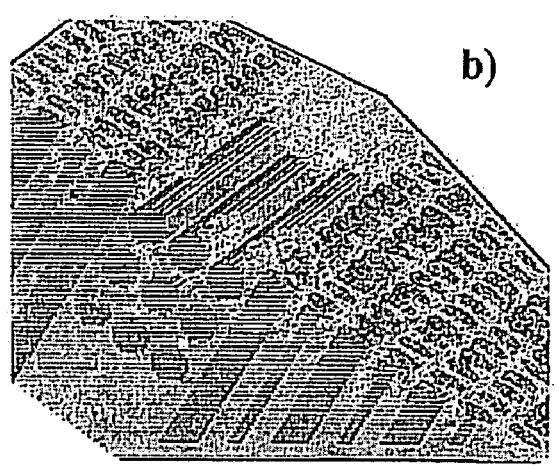
Figure 3:
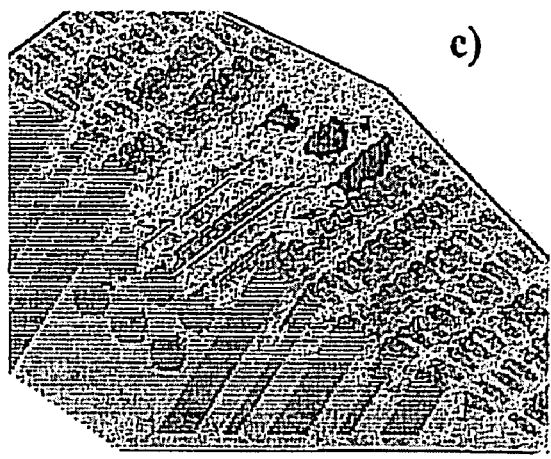
Figure 3:
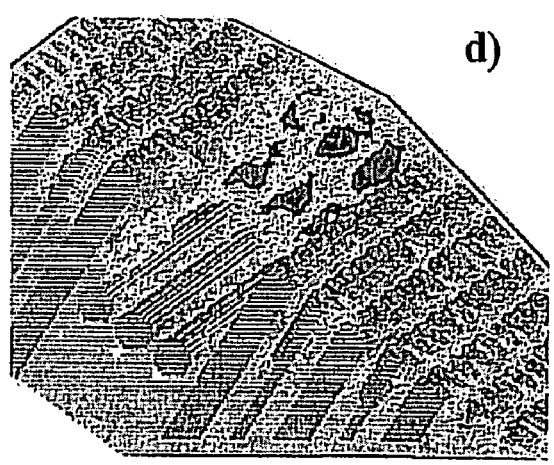

Consequent stages of the NB31 erosion process, simulated using the PEGASUS-3D code, are shown in FIG. 3. Shown here is the progressive erosion of the NB31 amor/shield surface under the repeated heating of the surface with a heat flux of 5 GW/m², simulating edge localized modes. The simulation performed uses the PEGASUS-3D code. The sample is shown in a front cross-sectional view to demonstrate the downward progression of the erosion. Erosion occurs mainly on the side of the stitched fibers and parallel to the heated surface. The matrix material above the stitched fibers is eroded first (see FIG. 3a) according to the overheating thereof, as was shown in FIG. 2a. After erosion of the matrix material, the stitched fibers that are bared/uncovered first are overheated for the same reasons. The CFC matrix material has microcrystalline structures and is eroded by small dust particles. Carbon fibers have a higher resistance to thermal stress and erode in long fragments. The stripping and removing of fibers is illustrated in FIGS. 3b and 3c. After the layer of fibers is removed, the process continues in the same manner for the following layers of matrix material and the fibers (FIG. 3d).

From the erosion mechanism described above, it can be immediately concluded that the arrangement of woven and stitched fibers used in the NB31 armor/shield is undesirable since said fibers run parallel to the heated surface and the heat flux passes transversely through said fibers. The conductivity in a direction transverse to the fibers is extremely low, at least 50 times lower than in the axial direction. Moreover, the conductivity transversely through the woven and stitched fibers is further reduced by the preferential cracking of the fibers at the shell.

The inclination of the woven and stitched fibers to the bundle fibers (ex-polyacrylnitrile direction) to the heated surface, as in the present invention, improves the thermal conductivity because the heat flux is directed also in the axial direction of the fibers. From the standpoint of preserving the maximum thermal conductivity and mechanical strength, it is possible to arrange both the stitched and woven fibers such that they are inclined at 45° with respect to the heated surface, while maintaining the arrangement of the pitch fibers. In this case, the stitched and woven fibers are perpendicular to each other and may have the same volume fraction as in NB31, so that they provide an armor/shield stiffness comparable to that of NB31. In addition, due to the 45° inclination of the stitched and woven fibers with respect to the heated surface, heat is directed along the fibers, and the heat flux is nearly independent of the cracks at the fiber/matrix interface. Angles different from 45° are also possible for the stitched and woven fibers to meet varying additional requirements for the intended use, or if one of the two must be predominant because of technical requirements.

FIGS. 1c and 1d illustrate an embodiment of the present invention. The thermally conductive structure of the pitch fibers is unchanged and the same as in NB31. The numerical simulation of erosion for the present invention was performed using the PEGASUS-3D code. In order to estimate the reduction of erosion, the present invention was given features the same thermophysical and mechanical parameters for the fibers and the matrix as those used for the NB31 CFC. FIGS. 4a through d show erosion patterns for the present invention after the same number of edge localized modes as is shown in FIGS. 3a through d for the NB31 CFC.

Figure 4:
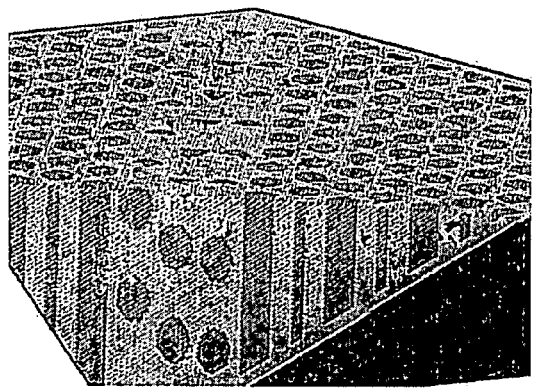
FIG. 4 shows the progression of erosion of the surface of the present invention.
Figure 4:
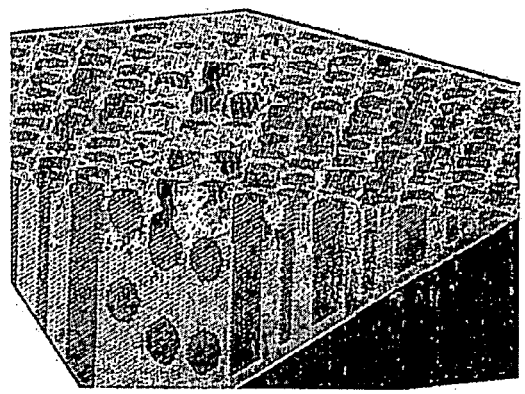
Figure 4:
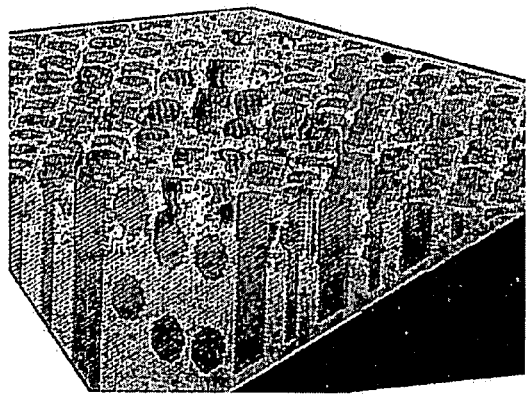
Figure 4:
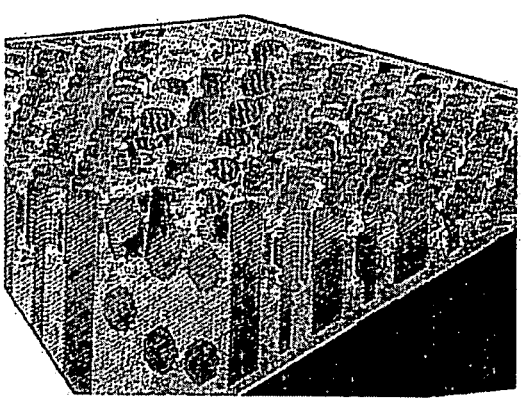

FIG. 4 illustrates the evolution of the present invention's surface, showing the erosion process under repetitive surface heating under the same conditions as for NB31. Shown are views of a sample after the same number of edge localized modes as was shown for NB31 in FIG. 3. The erosion of the CFC of the invention is much less and there is no pronounced difference in the erosion at the sites of woven and stitched fibers, inclined to the heated surface and near the pitch fibers. The comparison of the simulation results reveals that unlike NB31, the CFC of the invention does not show increased erosion due to the local overheating erosion mechanism. As expected, the structure of stitched and woven fibers of the present invention does not lead to overheating of the matrix material and the fibers. Although cracking of the interface between the matrix and the fibers is the same as in NB31, the average thermal conductivity in regions of woven and stitched fibers does not dramatically decrease, because the main heat flux is along the fibers, which are inclined at an angle of 45° with respect to the heated surface. The fiber structure and the temperature field within the samples are illustrated in FIG. 2b. The CFC of the present invention does not show the temperature increase above the cracked stitched fibers, which is typical of NB31 and determines the existence of a local overheating erosion mechanism. The numerical simulation of erosion for NB31 CFC and for the CFC of the present invention were performed under repeated edge localized mode loads.

Figure 6A:
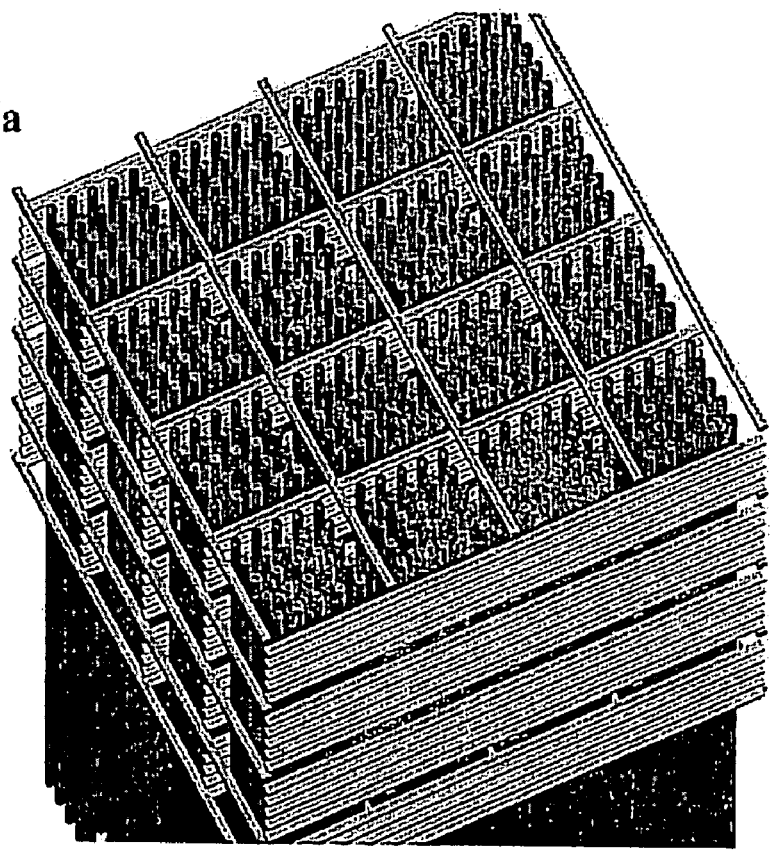
FIG. 6a shows the fiber structure of a prior NB31 without the carbon matrix.
Figure 6B:
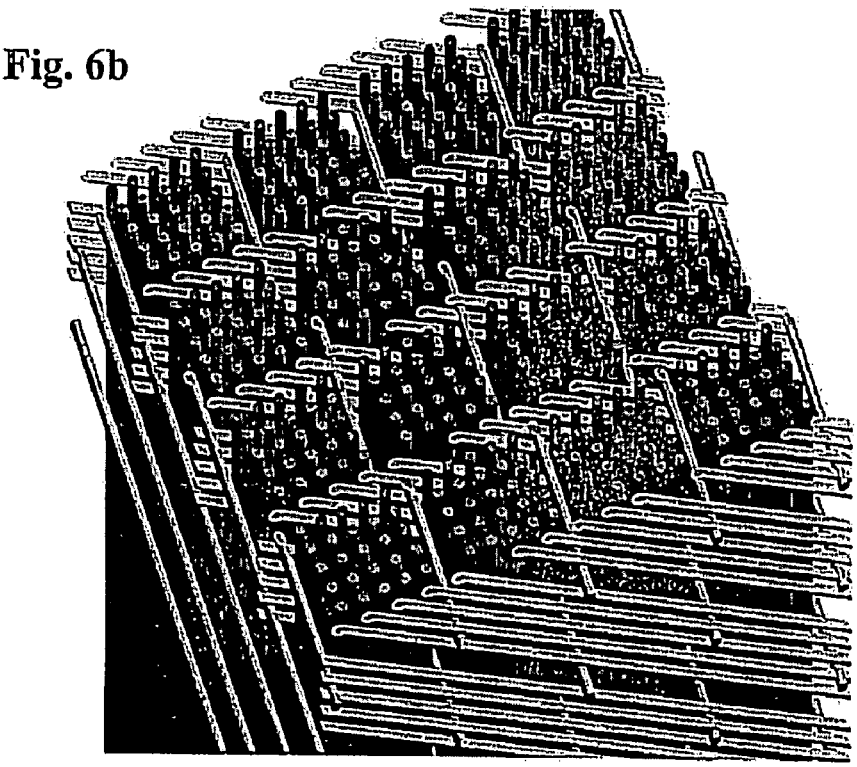
FIG. 6b shows the fiber structure of the present invention.

In the views of FIG. 6, the CFC structure is illustrated without the carbon matrix, so that the respective fiber arrangement is clearly shown. Specifically, FIG. 6a shows the conventional structure of NB31, while FIG. 6b shows that of an embodiment of the improved CFC of the present invention, in which the position of the pitch fibers is unchanged and the stitched and woven fibers are perpendicular to each other and inclined at 45° with respect to the impacted surface.

Figure 5:
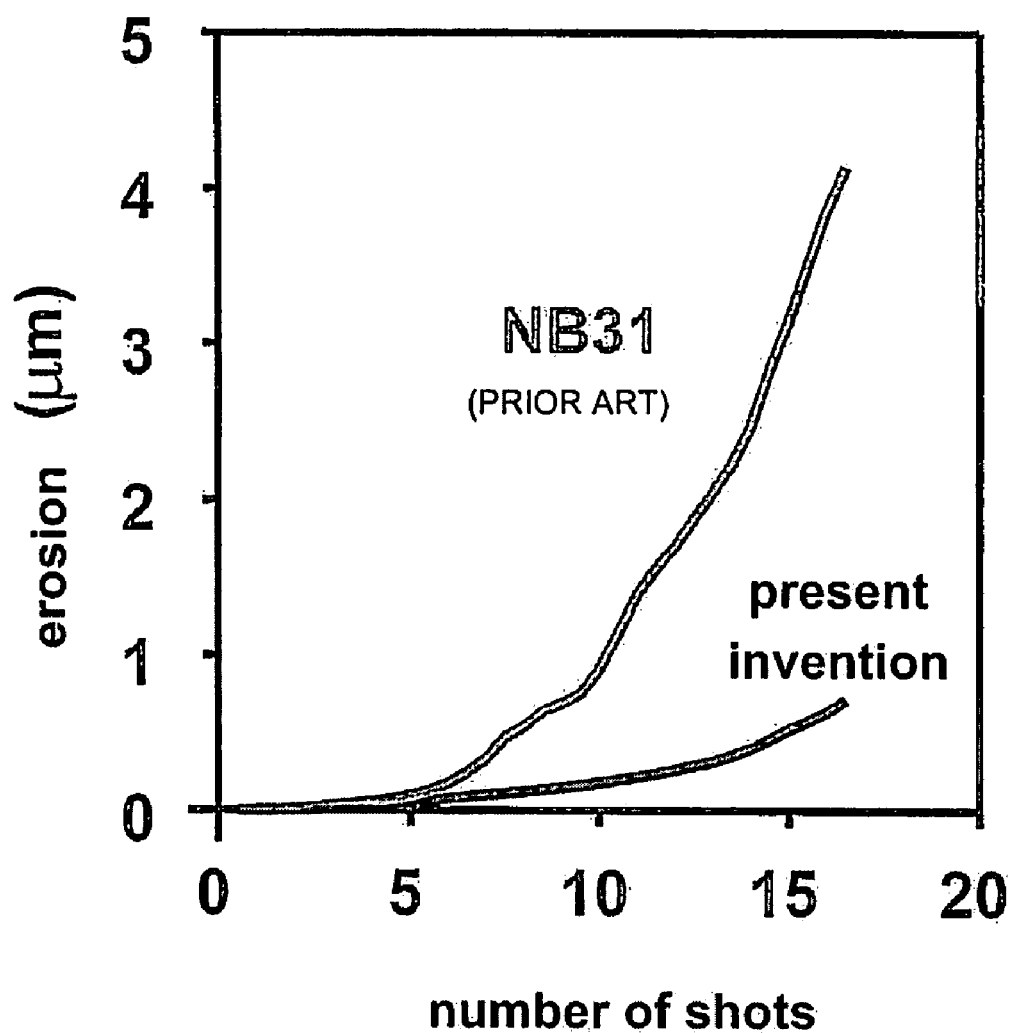
FIG. 5 shows a comparison of the erosion rates of a prior NB31 and of the present invention.

FIG. 5 shows the comparison of the erosion rates of two CFCs, namely of NB31 and of a CFC in accordance with the present invention, under repeated heating of the surface with a heat flux of 5 GW/m$^2$, simulating edge localized modes. The erosion is defined as the overall eroded volume of the numerical sample divided by the heated surface. According to the numerical results, the erosion rate is decisively reduced by the improved structure of the CFC of the present invention.

What is claimed is:

1. A plate-shaped carbon fiber composite comprising:
   an impact surface for exposure to a particle flux;
   a carbon matrix; and
   a base fabric comprising:
      pitch fibers disposed in the carbon matrix substantially perpendicular to the impact surface; and
      second fibers disposed at an angle with respect to the impact surface between 0° and 90°.

2. The plate-shaped carbon fiber composite recited in claim 1 wherein the pitch fibers comprise carbon.

3. The plate-shaped carbon fiber composite recited in claim 1 wherein the pitch fibers comprise polyacrylnitrile.

4. The plate shaped carbon fiber composite recited in claim 1 wherein the second fibers comprise polyacrylnitrile.

5. The plate shaped carbon fiber composite recited in claim 1 wherein the angle is between 30° and 60°.

6. The plate shaped carbon fiber composite recited in claim 1 wherein the second fibers are disposed at approximately 45° from the impact surface.

7. The plate shaped carbon fiber composite recited in claim 1 wherein the second fibers include at least one of woven fibers and stitched fibers.

8. The plate shaped carbon fiber composite recited in claim 1 wherein the second fibers include woven fibers and stitched fibers.

9. The plate shaped carbon fiber composite recited in claim 8 wherein the woven fibers are perpendicular to the stitched fibers.

10. The plate shaped carbon fiber composite recited in claim 1 wherein the pitch fibers are embedded in the carbon matrix.

11. The plate shaped carbon fiber composite recited in claim 1 wherein the second fibers are embedded in the carbon matrix.

12. A heat shield for a high speed body comprising a plate shaped carbon fiber composite, the plate shaped carbon fiber composite comprising:
   an impact surface for exposure to a particle flux;
   a carbon matrix; and
   a base fabric comprising:
      pitch fibers disposed in the carbon matrix substantially perpendicular to the impact surface; and
      second fibers disposed at an angle with respect to the impact surface between 0° and 90°.

13. The plate shaped carbon fiber composite recited in claim 12 wherein the angle is between 30° and 60°.

14. The plate shaped carbon fiber composite recited in claim 13 wherein the second fibers include at least one of woven fibers and stitched fibers.

15. The plate shaped carbon fiber composite recited in claim 13 wherein the second fibers include woven fibers and stitched fibers, and
   wherein the woven fibers are perpendicular to the stitched fibers.

16. A diverter for a fusion facility having armor comprising:
   a plate shaped carbon fiber composite comprising:
      an impact surface for exposure to a particle flux;
      a carbon matrix; and
      a base fabric comprising:
         pitch fibers disposed in the carbon matrix substantially perpendicular to the impact surface; and
         second fibers disposed at an angle with respect to the impact surface between 0° and 90°.

17. The plate shaped carbon fiber composite recited in claim 16 wherein the angle is between 30° and 60°.

18. The plate shaped carbon fiber composite recited in claim 16 wherein the second fibers include at least one of woven fibers and stitched fibers.

19. The plate shaped carbon fiber composite recited in claim 16 wherein the second fibers include woven fibers and stitched fibers, and
   wherein the woven fibers are perpendicular to the stitched fibers.

* * * * *